(12) United States Patent
Kato

(10) Patent No.: US 7,715,116 B2
(45) Date of Patent: May 11, 2010

(54) TELEPHOTO LENS SYSTEM

(75) Inventor: Koji Kato, Saitama (JP)

(73) Assignee: Hoya Corporation, Tokyo (JP)

( * ) Notice: Subject to any disclaimer, the term of this patent is extended or adjusted under 35 U.S.C. 154(b) by 209 days.

(21) Appl. No.: 12/099,818

(22) Filed: Apr. 9, 2008

(65) Prior Publication Data

US 2008/0252996 A1   Oct. 16, 2008

(30) Foreign Application Priority Data

Apr. 11, 2007   (JP)   ............... 2007-103461

(51) Int. Cl.
  *G02B 13/02*   (2006.01)
  *G02B 9/62*    (2006.01)

(52) U.S. Cl. ..................... 359/745; 359/756

(58) Field of Classification Search .......... 359/745–747
  See application file for complete search history.

(56) References Cited

U.S. PATENT DOCUMENTS

| | | |
|---|---|---|
| 4,904,070 A | 2/1990 | Hirakawa |
| 5,323,270 A | 6/1994 | Sato |
| 5,438,455 A | 8/1995 | Nakatsuji et al. |
| 5,610,769 A | 3/1997 | Shoji |
| 5,627,685 A * | 5/1997 | Yamanashi ............... 359/745 |
| 5,745,306 A * | 4/1998 | Sato ............... 359/745 |
| 6,313,955 B1 | 11/2001 | Yoneyama |
| 6,421,189 B1 | 7/2002 | Sensui |
| 6,549,343 B2 | 4/2003 | Yoneyama |
| 6,580,568 B2 | 6/2003 | Ozaki |
| 7,253,972 B2 | 8/2007 | Fujisaki et al. |
| 7,586,693 B2 * | 9/2009 | Ohno ............... 359/747 |
| 2007/0229983 A1 | 10/2007 | Saori |

FOREIGN PATENT DOCUMENTS

| | | |
|---|---|---|
| JP | 1-211711 | 8/1989 |
| JP | 4-294310 | 10/1992 |
| JP | 6-138385 | 5/1994 |
| JP | 6-201989 | 7/1994 |
| JP | 8-005907 | 1/1996 |

(Continued)

OTHER PUBLICATIONS

English language Abstract of JP 1-211711.

(Continued)

*Primary Examiner*—Jordan M. Schwartz
(74) *Attorney, Agent, or Firm*—Greenblum & Bernstein P.L.C.

(57) ABSTRACT

A telephoto lens system includes a positive first lens group, a positive second lens group, a diaphragm, a negative third lens group constituting a focusing lens group, and a positive fourth lens group. The first lens group includes a positive first lens element, a positive second lens element, and a negative third lens element. The second lens group includes a negative or a positive fourth lens element and a positive or negative fifth lens element which are cemented to each other. The third lens group includes a positive or negative sixth lens element and a negative or positive seventh lens element which are cemented to each other. The fourth lens group includes one positive eighth lens element. Upon focusing on an object at infinity to an object at a closer distance, the third lens group is moved toward the image. The telephoto lens system satisfies the following conditions.

3 Claims, 11 Drawing Sheets

FOREIGN PATENT DOCUMENTS

| | | |
|---|---|---|
| JP | 8-327896 | 12/1996 |
| JP | 9-203859 | 8/1997 |

OTHER PUBLICATIONS

English language Abstract of JP 4-294310.
English language Abstract of JP 6-138385.
English language Abstract of JP 6-201989.
English language Abstract of JP 8-327896.
English language Abstract of JP 9-203859.
English language Abstract of JP 8-005907.

* cited by examiner

Fig.8A
FNO.= 1:4.12

SPHERICAL ABERRATION

THE SINE CONDITION

— SA
-- SC

Fig.8B
FNO.= 1:4.12

SPHERICAL ABERRATION

CHROMATIC ABERRATION

— d Line
---- g Line
— — C Line

Fig.8C
y=21.64

LATERAL CHROMATIC ABERRATION

Fig.8D
y=21.64

ASTIGMATISM

DISTORTION

Fig.13

Fig.14A
FNO.=1:4.12

-0.5  0.5

SPHERICAL
ABERRATION
THE SINE
CONDITION

— SA
-- SC

Fig.14B
FNO.=1:4.12

-0.5  0.5

SPHERICAL
ABERRATION
CHROMATIC
ABERRATION

LATERAL
CHROMATIC
ABERRATION

—— d Line
······ g Line
---- C Line

ASTIGMATISM

DISTORTION

TELEPHOTO LENS SYSTEM

BACKGROUND OF THE INVENTION

1. Field of the Invention

The present invention relates to a telephoto lens system for use in a single-lens reflex (SLR) camera.

2. Description of the Related Art

In a recent exchangeable lens system for a SLR camera, a high-speed focusing capability is required in order to cope with the automatic focusing system thereof. In order to provide a high-speed focusing capability, the weight of the focusing lens group needs to be lighter.

In a lens system in which all the lens groups are advanced for focusing, the weight of the lens groups to be moved becomes heavier; and accordingly, such a lens system is not suitable for a higher-speed focusing capability.

In known telephoto lens systems, many lens systems employing an internal-focusing system which is arranged to move only a lens group provided in the middle of the telephoto lens system, have been proposed.

For example, in Japanese Unexamined Patent Publication (JUPP) No. H08-327896, four lens elements constitute an internal-focusing lens group; and in JUPP No. H08-5907 and JUPP No. H06-201989, three lens elements constitute an internal-focusing lens group.

Furthermore, in JUPP No. H01-211711 and JUPP No. H06-138385, two lens elements constitute an internal-focusing lens group.

Here note that in JUPP No. H01-211711, a first lens group includes two positive lens elements made of a special low-dispersion glass (Abbe number of over 80) in order to correct aberrations, especially chromatic aberration; and in JUPP No. H06-138385, the rearmost (final) lens group includes a positive lens element and a negative lens element which are cemented to each other in order to correct distortion and spherical aberration.

As disclosed in JUPP No. H08-327896 and JUPP No. H08-5907, the internal-focusing lens group includes three or four lens elements, and the weight of the focusing lens group is lighter compared to that of a lens system in which all the lens groups are advanced for focusing. However, such an internal-focusing lens group is heavier than the internal-focusing lens groups disclosed in JUPP No. H01-211711 and JUPP No. H06-138385, and is not advantageous for high-speed focusing.

Furthermore, in JUPP No. H08-327896, JUPP No. H08-5907 and JUPP No. H06-201989, the distance between the focusing lens group and a lens group therebehind is very short, so that a range in which the focusing lens group is allowed to move is very small. Consequently, the minimum photographic distance becomes longer.

In JUPP No. H01-211711 and JUPP No. H06-138385, focusing is performed with two lens elements, so that a high-speed focusing operation is possible.

In JUPP No. H01-211711, the first lens group includes the two positive lens elements made of a special low-dispersion glass (Abbe number of over 80) in order to correct aberrations, especially chromatic aberration. The first lens group of a telephoto lens system is generally known to have an extremely large aperture; and moreover, if the two positive lens elements are made of a special low-dispersion glass (Abbe number of over 80), such an optical arrangement inevitably causes an increase in manufacturing costs.

In JUPP No. H06-138385, the rearmost (final) lens group includes a positive lens element and a negative lens element which are cemented to each other, because it has been understood that a single meniscus lens element cannot correct both distortion and spherical aberration. The cemented lens elements, however, generally increase manufacturing costs, compared with the single (meniscus) lens element.

SUMMARY OF THE INVENTION

The present invention is to provide a telephoto lens system with an internal-focusing system, by which fluctuations of distortion and those of spherical aberration occurred upon focusing are reduced, and the minimum photographic distance can be made shorter.

The telephoto lens system includes a first lens group having a positive refractive power (hereinafter, a positive first lens group), a second lens group having a positive refractive power (hereinafter, a positive second lens group), a third lens group having a negative refractive power (hereinafter, a negative first lens group) and a fourth lens group having a positive refractive power (hereinafter, a positive fourth lens group), in this order from the object.

In addition, the telephoto lens system can be manufactured at low costs.

According to an aspect of the present invention, there is provided a telephoto lens system including a positive first lens group, a positive second lens group, a diaphragm, a negative third lens group constituting a focusing lens group, and a positive fourth lens group, in this order from the object.

The positive first lens group includes a positive first lens element, a positive second lens element, and a negative third lens element, in this order from the object.

The positive second lens group a negative or positive fourth lens element and a positive or negative fifth lens element which are cemented to each other, in this order from the object.

The negative third lens group includes a positive or negative sixth lens element and a negative or positive seventh lens element which are cemented to each other, in this order from the object.

The positive fourth lens group includes a positive eighth lens element.

Upon focusing on an object at infinity to an object at a closer distance, the negative third lens group is moved toward the image.

The telephoto lens system satisfies the following conditions:

$$1.4 < f/f1 < 1.8 \tag{1}$$

$$2.4 < f/f12 < 3.0 \tag{2}$$

$$-5.5 < f/f3 < -3.5 \tag{3}$$

wherein f designates a focal length of the telephoto lens system;

f1 designates the focal length of the positive first lens group;

f12 designates the combined focal length of the positive first lens group and the positive second lens groups; and f3 designates a focal length of the negative third lens group.

The telephoto lens system preferably satisfies the following condition:

$$-0.4 < r13/f4 < -0.05 \tag{4}$$

wherein r13 designates the radius of curvature (<0) of the object-side surface of the eighth lens element; and f4 designates the focal length of the eighth lens element.

The telephoto lens system preferably satisfies the following conditions:

$$vd_2 > 80 \quad (5)$$

$$vd_5 > 80 \quad (6)$$

wherein $vd_2$ designates the Abbe number of the second lens element; and $vd_5$ designates the Abbe number of the fifth lens element.

The present disclosure relates to subject matter contained in Japanese Patent Application No. 2007-103461 (filed on Apr. 11, 2007) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

The telephoto lens system of the present invention, as shown in each embodiment in FIGS. 1, 4, 7, 10, 13, 16 and 19, includes a positive first lens group 10, a positive second lens group 20, a diaphragm S, a negative third lens group 30, and a positive fourth lens group 40, in this order from the object.

A symbol 'I' designates an imaging plane.

The positive first lens group 10 includes a positive first lens element 11, a positive second lens element 12, and a negative third lens element 13, in this order from the object.

The positive second lens group 20 includes a negative fourth lens element 21 and a positive fifth lens element 22 which are cemented to each other, in this order from the object.

The negative third lens group 30 includes a positive sixth lens element 31 and a negative seventh lens element 32 which are cemented to each other, in this order from the object.

The positive fourth lens group 40 includes a positive eighth lens element 41.

Upon focusing from an object at infinity to an object at a closer distance, the negative third lens group 30 moves toward the image.

In the positive second lens group 20 and the negative third lens group 30, the order of the positive lens element and the negative lens element can be reversed.

Condition (1) specifies the focal length (refractive power) of the positive first lens group 10, and is for achieving a more compact telephoto lens system.

If the refractive power of the positive first lens group 10 becomes stronger to the extent that f/f1 exceeds the upper limit of condition (1), undercorrected spherical aberration remains in the positive first lens group 10, and the residual undercorrected spherical aberration in the positive first lens group 10 has to be corrected by the positive second lens group 20 and thereafter. Consequently, the positive refractive power of the positive second lens group 20 becomes relatively weaker, since the positive refractive power of the positive first lens group 10 is stronger. Moreover, the negative third lens group 30 is constituted by the two lens elements, and the positive fourth lens group 40 is constituted by one lens element, so that aberrations occurred in the positive first lens group 10 cannot be corrected well by these lens groups. As a result, aberration fluctuations become larger at a closer distance.

Furthermore, if an attempt is made to correct undercorrected spherical aberration, the thickness of the positive lens elements in the positive first lens group 10 has to be increased, which undesirably increases the weight of the positive first lens group 10, and hence, that of the entire telephoto lens system.

If the refractive power of the positive first lens group 10 becomes weaker to the extent that f/f1 exceeds the lower limit of condition (1), the positive refractive power of the positive second lens group 20 has relatively to be stronger. Consequently, the correcting of spherical aberration becomes difficult.

In addition, the telephoto ratio cannot be secured, so that the telephoto lens system cannot be miniaturized. Moreover, operability of the telephoto lens system deteriorates, and the amount of peripheral illumination decreases.

Condition (2) specifies the combined refractive power of the positive first lens group 10 and the positive second lens group 20 which are positioned in front of the diaphragm S.

If the combined refractive power of the positive first lens group 10 and the positive second lens group 20 becomes stronger to the extent that f/f12 exceeds the upper limit of condition (2), spherical aberration and axial chromatic aberration are undesirably undercorrected.

If the combined refractive power of the positive first lens group 10 and the positive second lens group 20 becomes weaker to the extent that f/f12 exceeds the lower limit of condition (2), the overall length of the telephoto lens system becomes longer.

Additionally, the refractive power of the negative third lens group 30 becomes relatively weaker, so that the traveling distance of the negative third lens group 30 upon focusing becomes longer. Consequently, the minimum photographic distance becomes longer due to a mechanical constraint.

Condition (3) specifies the negative refractive power of the negative third lens group 30.

If the negative refractive power of the negative third lens group 30 becomes stronger to the extent that f/f3 exceeds the lower$_{[hasu2-1]}$ limit of condition (3), the amount of change in aberrations such as spherical aberration and coma becomes undesirably larger upon focusing.

If the negative refractive power of the negative third lens group 30 becomes weaker to the extent that f/f3 exceeds the upper limit of condition (3), the positive refractive power of the positive second lens group 20 becomes weaker. As a result, spherical aberration which is not corrected in the positive first lens group 10 is undercorrected.

Additionally, the traveling distance of the negative third lens group 30 upon focusing becomes longer, so that the minimum photographic distance becomes longer due to a mechanical constraint.

The positive eighth lens element constituting the positive fourth lens group 40 preferably includes a positive meniscus single lens element having the concave surface facing toward the object, and the object-side concave surface preferably satisfies condition (4). This is because the correcting of both distortion and spherical aberration cannot be made by a meniscus single lens element having the convex surface facing toward the object.

If the radius of curvature of the object-side concave surface of the eighth lens element becomes smaller to the extent that r13/f4 exceeds the upper limit of condition (4), the occurrence of spherical aberrations from the infinite photographic distance to the minimum photographic distance cannot be balanced.

If the radius of curvature of the object-side concave surface of the eighth lens element becomes larger to the extent that r13/f4 exceeds the lower limit of condition (4), the positive fourth lens group 40 can no longer be constituted by one lens element, i.e., the correcting of aberrations is difficult with only one lens element. Consequently, an undesirable increase in weight of the positive fourth lens group 40 (and hence, the entire telephoto lens system), and in manufacturing costs are caused by an increase in the number of lens elements.

Conditions (5) and (6) specify the Abbe number of the positive second lens element 12 in the positive first lens group 10, and the Abbe number of the fifth lens element 22 in the positive second lens group 20.

By utilizing a special low-dispersion glass material which satisfies conditions (5) and (6) for these two lens elements (12, 22), the correcting of axial chromatic aberration and lateral chromatic aberration can suitably be made.

For example, in the aforementioned JUPP No. H01-211711, a special low-dispersion glass material having an Abbe number exceeding 80 is used to form two positive lens elements in the larger-aperture first lens group. In comparison with JUPP No. H01-211711, the embodiments of the present invention provide one positive lens element (12, 22) made of the low-dispersion glass material having an Abbe number exceeding 80 in each of the positive first lens group 10 and the positive second lens group 20 whose aperture is smaller than that of the positive first lens group 10. Due to this arrangement, the manufacturing costs can be reduces, while the quality of the correcting of chromatic aberration is maintained.

In the case where the positive first lens element 11 is made of the low-dispersion glass material having an Abbe number exceeding 80, the quality of the correcting of aberrations is substantially the same; however, it is more appropriate to form the positive second lens element 12 by the low-dispersion glass material having an Abbe number exceeding 80, than to form the positive first lens element 11 thereby. This is because there is a possibility that the positive first lens element 11 may be in contact external objects.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

In the tables, FNO. designates the F-number, f designates the focal length of the entire lens system, W designates the half angle-of-view (°), fB designates the back focal distance, r designates the radius of curvature, d designates the lens-element thickness or a distance between lens elements (lens groups), $N_d$ designates the refractive index of the d-line, and ν designates the Abbe number.

The values of d for the surface No. 9 and the surface No. 12 designate the distance between the positive second lens group 20 and the negative third lens group 30, and the distance between the negative third lens group 30 and the positive fourth lens group 40, from the left to right, (i) when an object at infinity is in an in-focus state, (ii) when an object at a finite distance is in an in-focus state (photographic magnification of −0.02), and (iii) when an object at the closest distance is in an in-focus state (photographic magnification of −0.25 or −0.26).

In the embodiments to be discussed below, no aspherical surface is provided on lens elements.

Embodiment 1

Figure 1:
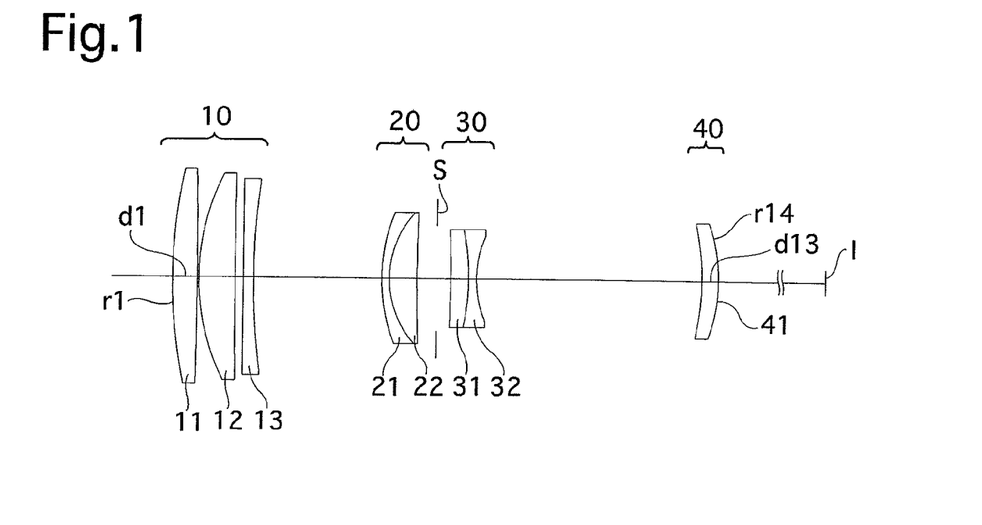
FIG. 1 shows a lens arrangement of a first embodiment of the telephoto lens system according to the present invention, when an object at infinity is in an in-focus state.
Figure 2A:
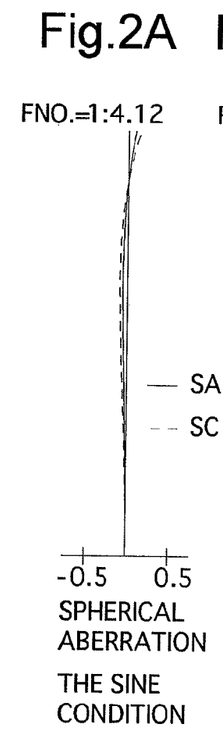
FIGS. 2A, 2B, 2C, 2D and 2E show aberrations occurred in the lens arrangement shown in FIG. 1, when an object at infinity is photographed.
Figures 2B, 2C:
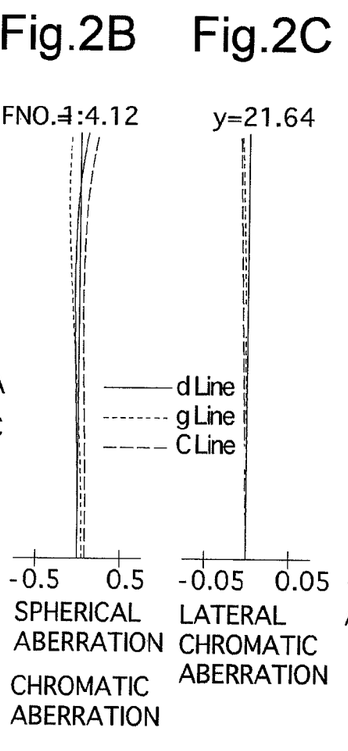
Figure 2D:
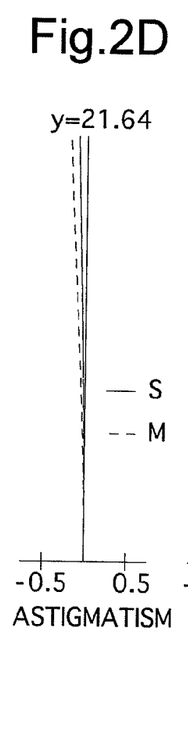
Figure 2E:
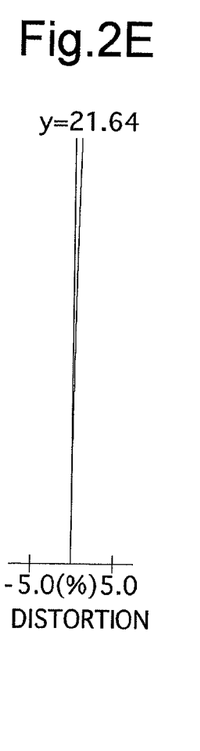
Figure 3A:
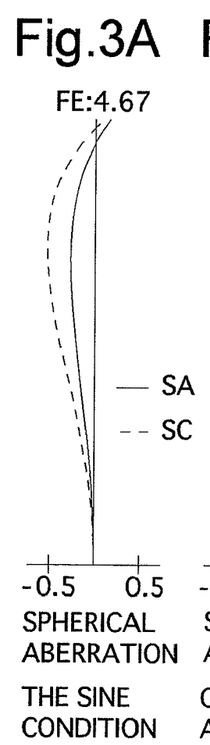
FIGS. 3A, 3B, 3C, 3D and 3E show aberrations occurred in the lens arrangement shown in FIG. 1, when an object at a closer distance is photographed.
Figures 3B, 3C:
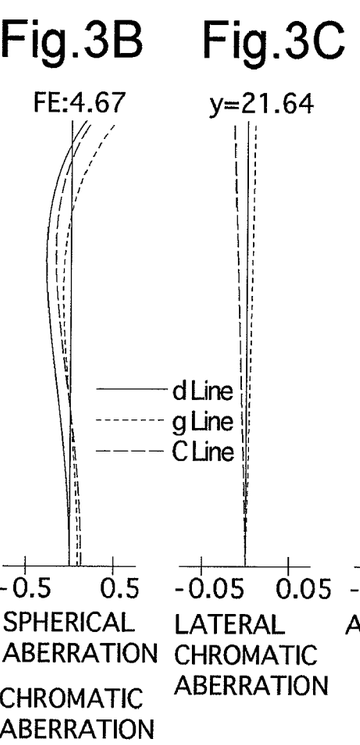
Figure 3D:
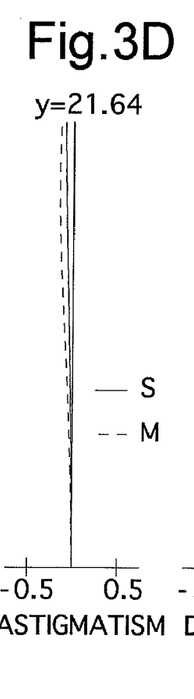
Figure 3E:
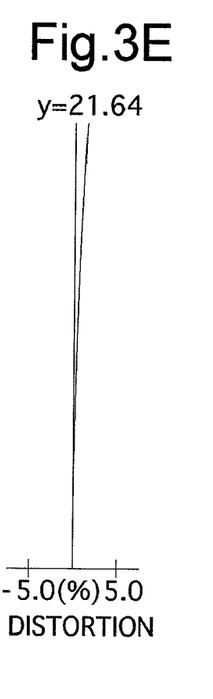

FIG. 1 shows the lens arrangement of the first embodiment of the telephoto lens system according to the present invention, when an object at infinity is in an in-focus state.

FIGS. 2A through 2E show aberrations occurred in the lens arrangement shown in FIG. 1, when an object at infinity is photographed.

FIGS. 3A through 3E show aberrations occurred in the lens arrangement shown in FIG. 1, when an object at a closer distance is photographed.

Table 1 shows the numerical data of the first embodiment.

The positive first lens group 10 (surface Nos. 1 through 6) includes a positive biconvex lens element (first lens element) 11, a positive meniscus lens element (second lens element) 12 having the convex surface facing toward the object, and a negative lens element (third lens element) 13 having a flat surface facing toward the object, in this order from the object.

The positive second lens group 20 (surface Nos. 7 through 9) includes a negative meniscus lens element (fourth lens element) 21 and a positive meniscus lens element (fifth lens element) 22 which are cemented to each other, in this order from the object. The negative meniscus lens element (fourth lens element) 21 having the convex surface facing toward the object, and the positive meniscus lens element (fifth lens element) 22 having the convex surface facing toward the object, in this order from the object.

The negative third lens group 30 (surface Nos. 10 through 12) includes a positive meniscus lens element (sixth lens element) 31 and a biconcave negative lens element (seventh lens element) 32 which are cemented to each other, in this order from the object. The positive meniscus lens element (sixth lens element) 31 having the convex surface facing toward the image.

The positive fourth lens group 40 (surface Nos. 13 and 14) includes a positive meniscus single lens element (eighth lens element) 41 having the concave surface facing toward the object.

The diaphragm S is provided 4.558 in front of (on the object side of) the negative third lens group 30 (surface No. 10).

TABLE 1

$F_{NO.} = 1{:}4.1$
$f = 291.01$
$W = 4.2$
$fB = 54.00$
$m = 0.00\text{--}{-}0.02\text{--}{-}0.25$

| Surf. No. | r | d | Nd | ν |
|---|---|---|---|---|
| 1 | 161.225 | 8.31 | 1.48749 | 70.2 |
| 2 | −1623.208 | 0.50 | — | — |
| 3 | 74.138 | 12.00 | 1.43875 | 95.0 |
| 4 | 2644.674 | 2.71 | — | — |
| 5 | ∞ | 3.50 | 1.80651 | 43.2 |
| 6 | 220.986 | 42.49 | — | — |
| 7 | 56.983 | 2.50 | 1.74851 | 43.8 |
| 8 | 31.982 | 9.24 | 1.49700 | 81.6 |
| 9 | 515.563 | 11.28-12.30-25.07 | — | — |
| 10 | −428.107 | 5.98 | 1.82952 | 24.4 |
| 11 | −75.095 | 2.57 | 1.57800 | 47.8 |
| 12 | 35.980 | 74.74-73.72-60.95 | — | — |

TABLE 1-continued $F_{NO.} = 1{:}4.1$
$f = 291.01$
$W = 4.2$
$fB = 54.00$
$m = 0.00\text{--}{-}0.02\text{--}{-}0.25$

| Surf. No. | r | d | Nd | ν |
|---|---|---|---|---|
| 13 | −80.226 | 5.39 | 1.62586 | 35.8 |
| 14 | −55.206 | — | — | — |

Embodiment 2

Figure 4:
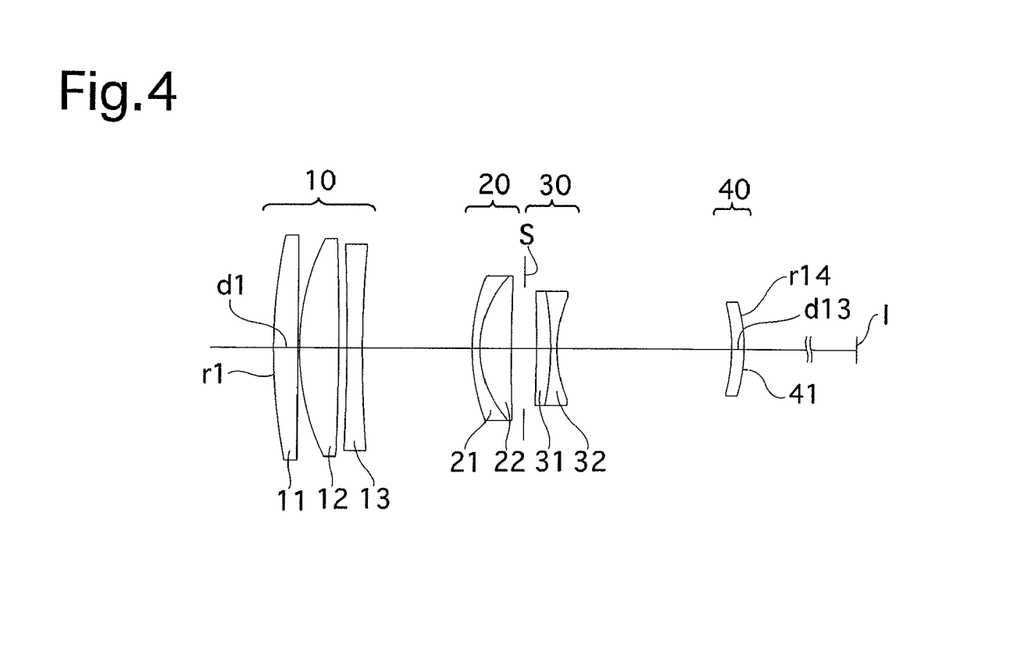
FIG. 4 shows a lens arrangement of a second embodiment of the telephoto lens system according to the present invention, when an object at infinity is in an in-focus state.
Figures 5A, 5B, 5C:
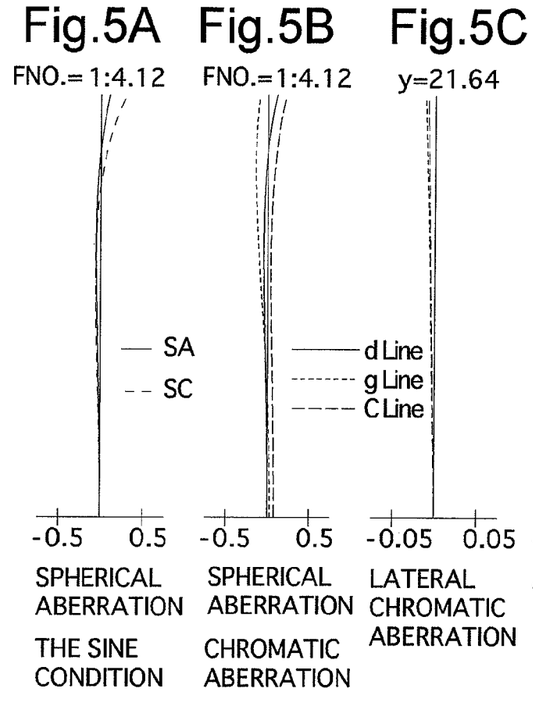
FIGS. 5A, 5B, 5C, 5D and 5E show aberrations occurred in the lens arrangement shown in FIG. 4, when an object at infinity is photographed.
Figure 5D:
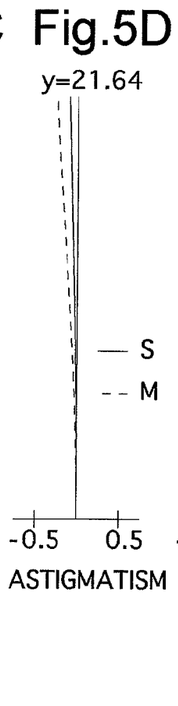
Figure 5E:
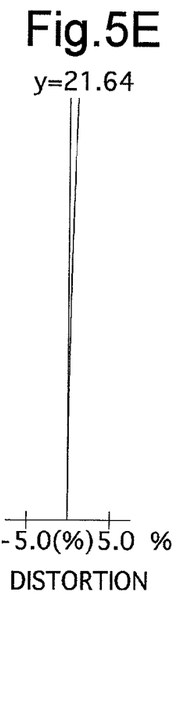
Figures 6A, 6B, 6C:
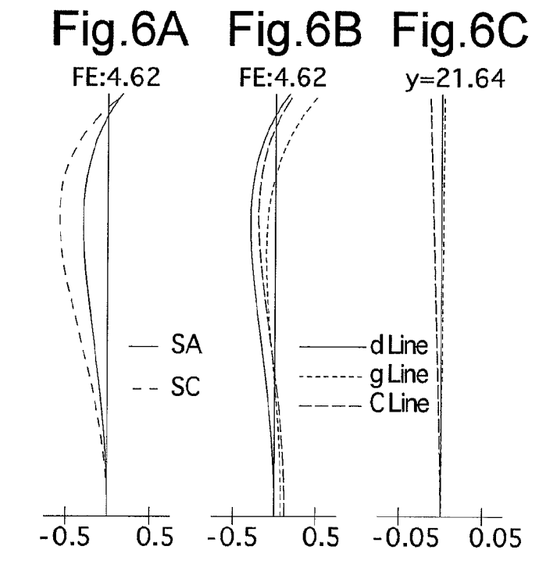
FIGS. 6A, 6B, 6C, 6D and 6E show aberrations occurred in the lens arrangement shown in FIG. 4, when the object at a closer distance is photographed.
Figure 6D:
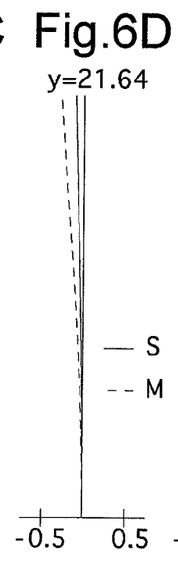
Figure 6E:
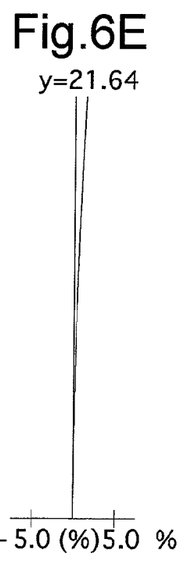

FIG. 4 shows the lens arrangement of the second embodiment of the telephoto lens system according to the present invention, when an object at infinity is in an in-focus state.

FIGS. 5A through 5E show aberrations occurred in the lens arrangement shown in FIG. 4, when an object at infinity is photographed.

FIGS. 6A through 6E show aberrations occurred in the lens arrangement shown in FIG. 4, when the object at a closer distance is photographed.

Table 2 shows the numerical data of the second embodiment.

In the positive first lens group 10, the first lens element 11 is a positive meniscus lens element having the convex surface toward the object, the second lens element 12 is a positive biconvex lens element, and the third lens element 13 is a negative biconcave lens element. Except the arrangement of the positive first lens group 10, the other lens arrangements are the same as that of the first embodiment.

The diaphragm S is provided 4.000 in front of (on the object side of) the negative third lens group 30 (surface No. 10).

TABLE 2

$F_{NO.} = 1{:}4.1$
$f = 291.00$
$W = 4.2$
$fB = 85.97$
$m = 0.00\text{--}{-}0.02\text{--}{-}0.26$

| Surf. No. | r | d | Nd | ν |
|---|---|---|---|---|
| 1 | 168.180 | 7.73 | 1.48749 | 70.2 |
| 2 | 26148.242 | 0.50 | — | — |
| 3 | 75.811 | 12.50 | 1.43875 | 95.0 |
| 4 | −943.831 | 2.59 | — | — |
| 5 | −780.669 | 5.00 | 1.80440 | 39.6 |
| 6 | 359.299 | 35.11 | — | — |
| 7 | 60.388 | 2.50 | 1.74400 | 44.8 |
| 8 | 32.935 | 9.96 | 1.49700 | 81.6 |
| 9 | 554.073 | 8.00-8.99-21.40 | — | — |
| 10 | −507.788 | 4.62 | 1.80518 | 25.4 |
| 11 | −90.138 | 2.00 | 1.57135 | 53.0 |
| 12 | 41.762 | 54.92-53.94-41.52 | — | — |
| 13 | −53.532 | 4.00 | 1.80518 | 25.4 |
| 14 | −49.805 | — | — | — |

Embodiment 3

Figure 7:
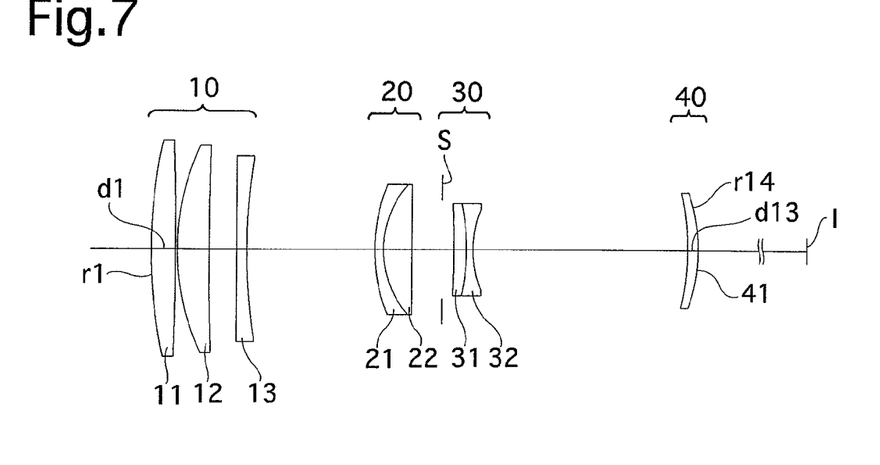
FIG. 7 shows a lens arrangement of a third embodiment of the telephoto lens system according to the present invention, when an object at infinity is in an in-focus state.
Figure 8A:
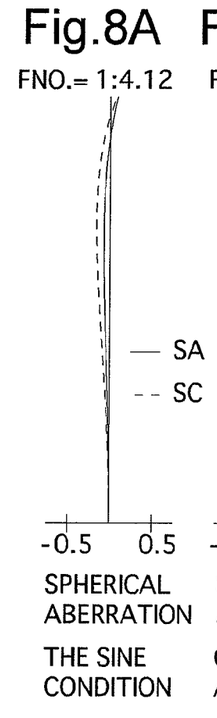
FIGS. 8A, 8B, 8C, 8D and 8E show aberrations occurred in the lens arrangement shown in FIG. 7, when an object at infinity is photographed.
Figures 8B, 8C:
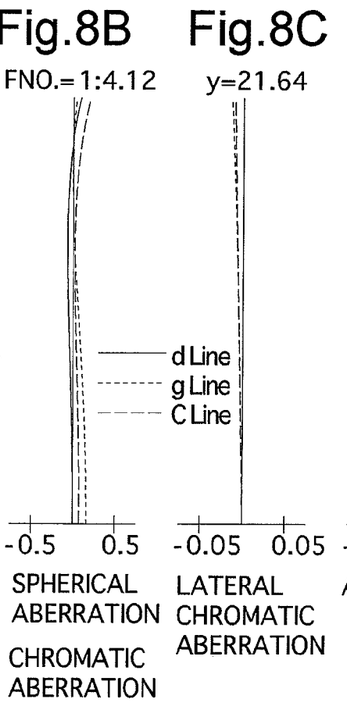
Figure 8D:
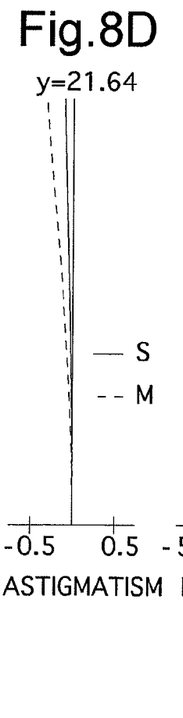
Figure 8E:
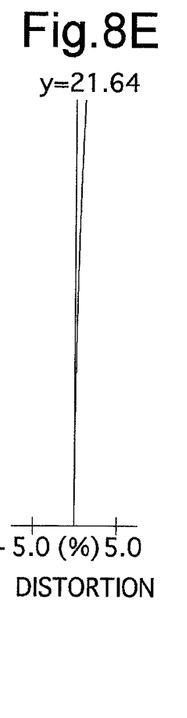
Figure 9A:
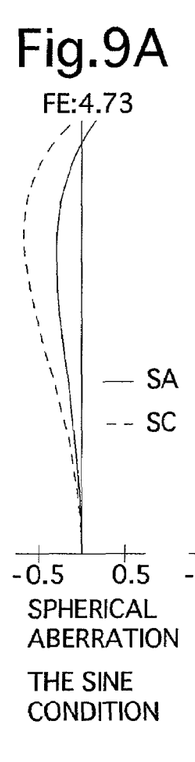
FIGS. 9A, 9B, 9C, 9D and 9E show aberrations occurred in the lens arrangement shown in FIG. 7, when the object at a closer distance is photographed.
Figure 9B:
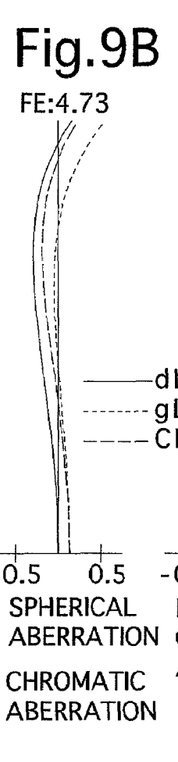
Figure 9C:
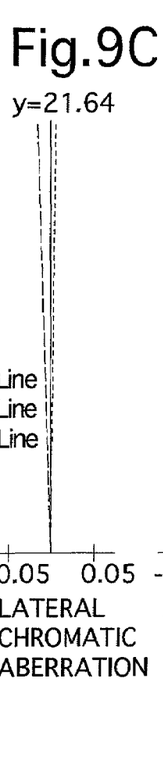
Figure 9D:
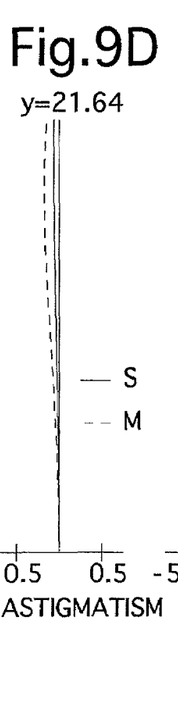
Figure 9E:
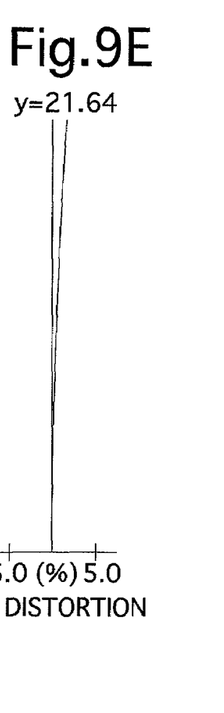

FIG. 7 shows the lens arrangement of the third embodiment of the telephoto lens system according to the present invention, when an object at infinity is in an in-focus state.

FIGS. 8A through 8E show aberrations occurred in the lens arrangement shown in FIG. 7, when an object at infinity is photographed.

FIGS. 9A through 9E show aberrations occurred in the lens arrangement shown in FIG. 7, when the object at a closer distance is photographed.

Table 3 shows the numerical data of the third embodiment.

The basic lens arrangement of the third embodiment is the same as that of the first embodiment.

The diaphragm S is provided 4.000 in front of (on the object side of) the negative third lens group 30 (surface No. 10).

TABLE 3

$F_{NO.} = 1:4.1$
f = 290.98
W = 4.2
fB = 53.98
m = 0.00--0.02--0.25

| Surf. No. | r | d | Nd | ν |
|---|---|---|---|---|
| 1 | 159.014 | 8.09 | 1.48749 | 70.2 |
| 2 | −1026.964 | 0.50 | — | — |
| 3 | 79.162 | 10.55 | 1.43875 | 95.0 |
| 4 | 948.739 | 9.15 | — | — |
| 5 | ∞ | 3.50 | 1.80400 | 39.5 |
| 6 | 186.305 | 42.15 | — | — |
| 7 | 55.547 | 2.87 | 1.74399 | 45.8 |
| 8 | 32.594 | 9.23 | 1.49700 | 81.6 |
| 9 | 1795.980 | 14.17-15.22-28.30 | — | — |
| 10 | −299.442 | 4.13 | 1.84666 | 23.8 |
| 11 | −69.493 | 2.20 | 1.57140 | 45.7 |
| 12 | 35.265 | 71.16-70.11-57.03 | — | — |
| 13 | −80.988 | 3.50 | 1.65000 | 33.4 |
| 14 | −54.934 | — | — | — |

Embodiment 4

Figure 10:
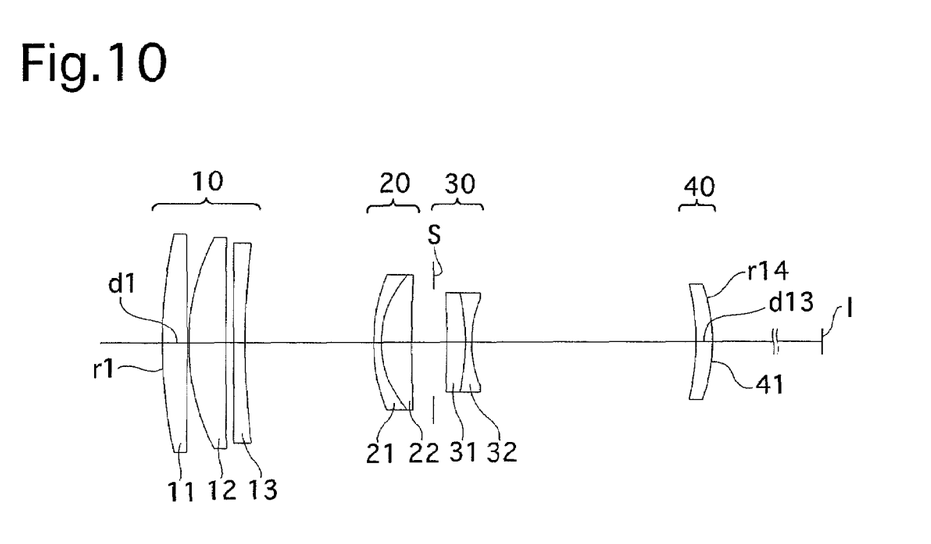
FIG. 10 shows a lens arrangement of a fourth embodiment of the telephoto lens system according to the present invention, when an object at infinity is in an in-focus state.
Figure 11A:
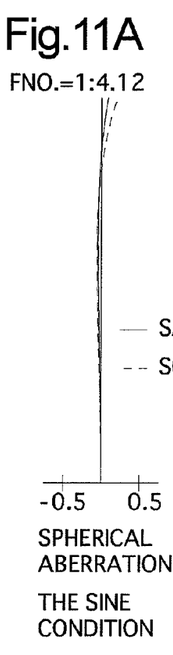
FIGS. 11A, 11B, 11C, 11D and 11E show aberrations occurred in the lens arrangement shown in FIG. 10, when an object at infinity is photographed.
Figure 11B:
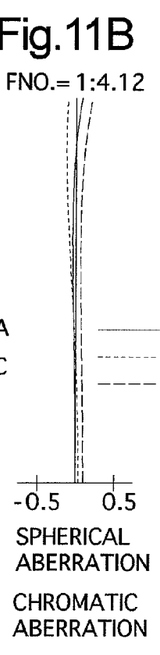
Figure 11C:
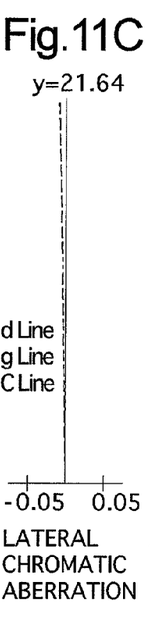
Figure 11D:
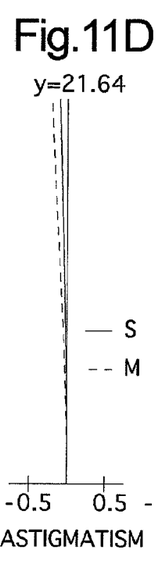
Figure 11E:
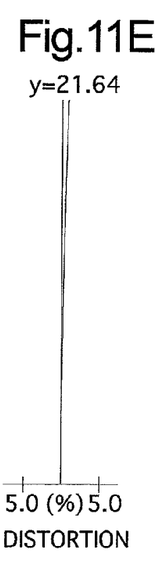
Figure 12A:
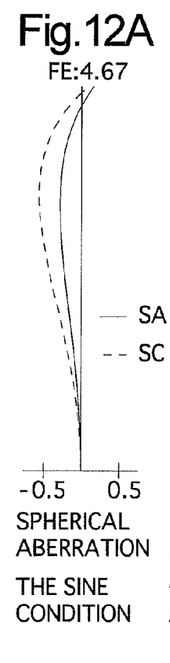
FIGS. 12A, 12B, 12C, 12D and 12E show aberrations occurred in the lens arrangement shown in FIG. 10, when the object at a closer distance is photographed.
Figure 12B:
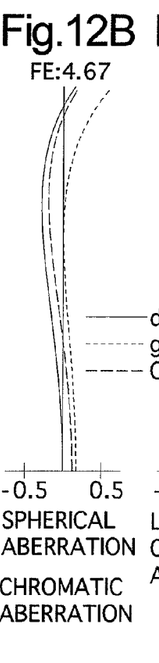
Figure 12C:
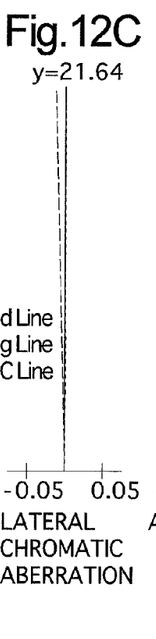
Figure 12D:
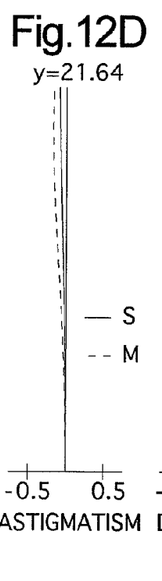
Figure 12E:
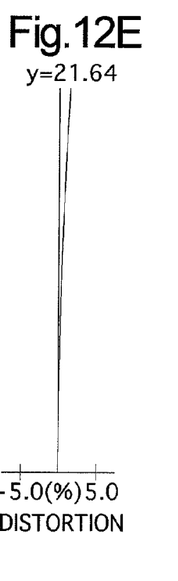

FIG. 10 shows the lens arrangement of the fourth embodiment of the telephoto lens system according to the present invention, when an object at infinity is in an in-focus state.

FIGS. 11A through 11E show aberrations occurred in the lens arrangement shown in FIG. 10, when an object at infinity is photographed.

FIGS. 12A through 12E show aberrations occurred in the lens arrangement shown in FIG. 10, when the object at a closer distance is photographed.

Table 4 shows the numerical data of the fourth embodiment.

The basic lens arrangement of the fourth embodiment is the same as that of the first embodiment.

The diaphragm S is provided 4.582 in front of (on the object side of) the negative third lens group 30 (surface No. 10).

TABLE 4

$F_{NO.} = 1:4.12$
f = 291.00
W = 4.2
fB = 54.92
m = 0.00--0.02--0.25

| Surf. No. | r | d | Nd | ν |
|---|---|---|---|---|
| 1 | 163.788 | 8.21 | 1.48749 | 70.2 |
| 2 | −1820.141 | 0.50 | — | — |
| 3 | 74.742 | 12.00 | 1.43875 | 95.0 |
| 4 | 3555.257 | 2.65 | — | — |
| 5 | ∞ | 3.50 | 1.80440 | 39.6 |
| 6 | 220.063 | 42.42 | — | — |
| 7 | 56.850 | 2.50 | 1.74400 | 44.8 |
| 8 | 32.121 | 10.00 | 1.49700 | 81.6 |

TABLE 4-continued $F_{NO.} = 1:4.12$
f = 291.00
W = 4.2
fB = 54.92
m = 0.00--0.02--0.25

| Surf. No. | r | d | Nd | ν |
|---|---|---|---|---|
| 9 | 505.628 | 11.49-12.51-25.30 | — | — |
| 10 | −427.554 | 6.00 | 1.80518 | 25.4 |
| 11 | −72.989 | 2.20 | 1.57135 | 53.0 |
| 12 | 36.096 | 73.59-72.57-59.78 | — | — |
| 13 | −78.673 | 5.21 | 1.60562 | 43.7 |
| 14 | −54.918 | — | — | — |

Embodiment 5

Figure 13:
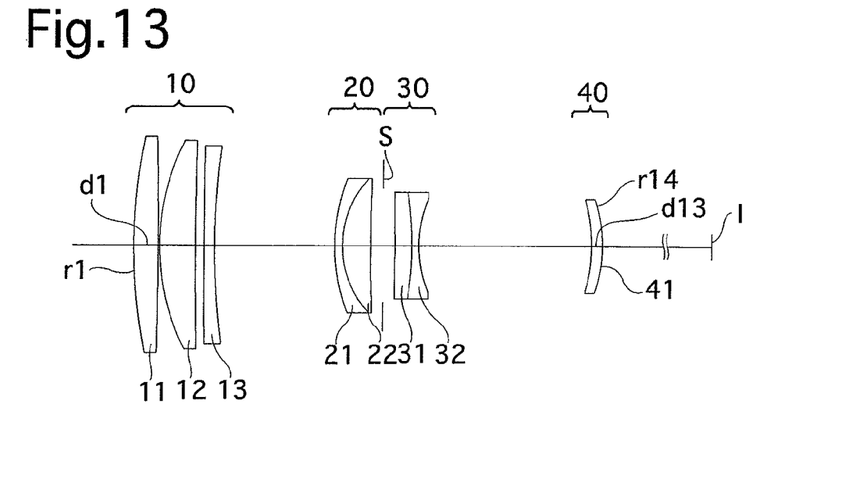
FIG. 13 shows a lens arrangement of a fifth embodiment of the telephoto lens system according to the present invention, when an object at infinity is in an in-focus state.
Figure 14A:
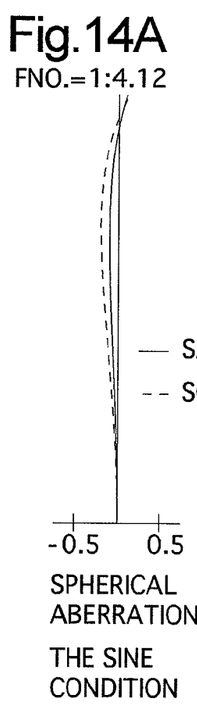
FIGS. 14A, 14B, 14C, 14D and 14E show aberrations occurred in the lens arrangement shown in FIG. 13, when an object at infinity is photographed.
Figure 14B:
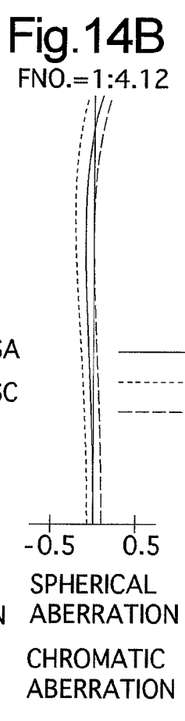
Figure 14C:
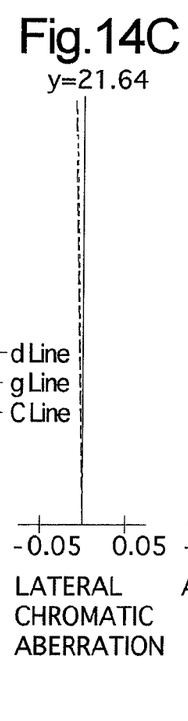
Figure 14D:
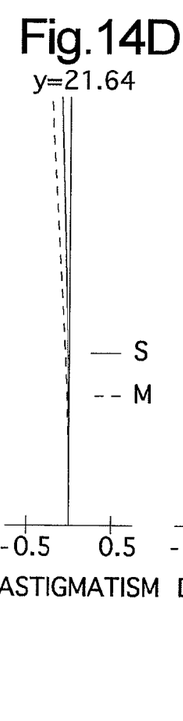
Figure 14E:
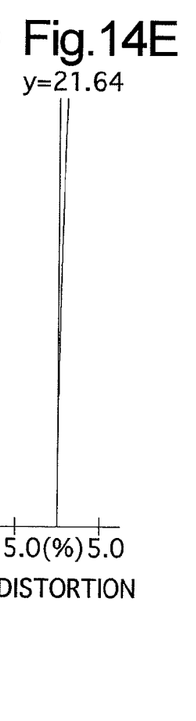
Figure 15A:
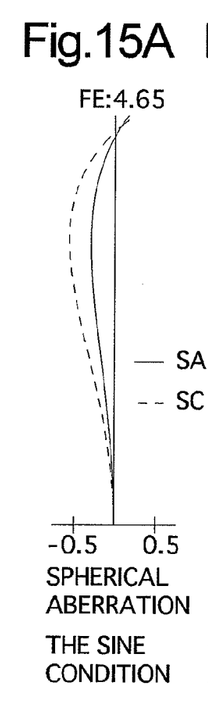
FIGS. 15A, 15B, 15C, 15D and 15E show various aberrations occurred in the lens arrangement shown in FIG. 13, when an object at a closer distance is photographed.
Figures 15B, 15C:
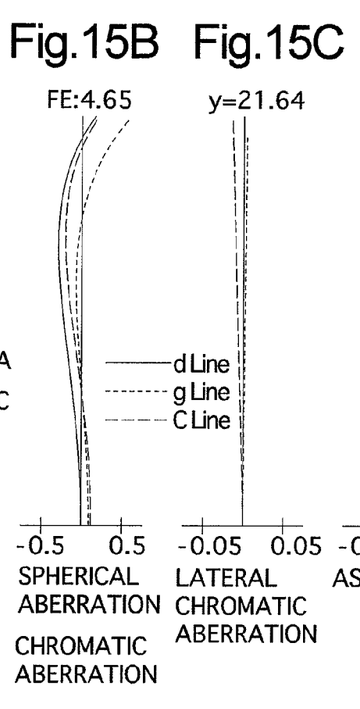
Figures 15D, 15E:
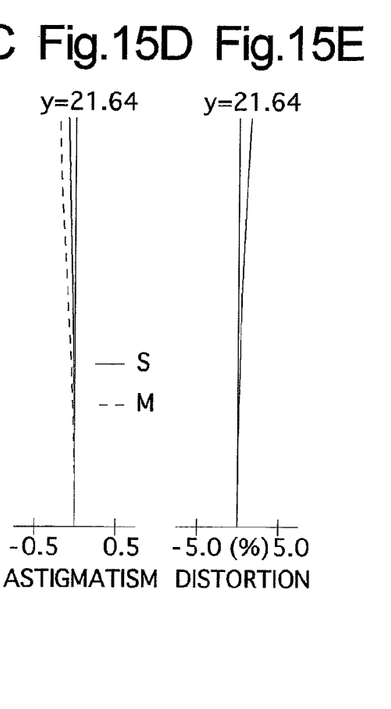

FIG. 13 shows the lens arrangement of the fifth embodiment of the telephoto lens system according to the present invention, when an object at infinity is in an in-focus state.

FIGS. 14A through 14E show aberrations occurred in the lens arrangement shown in FIG. 13, when an object at infinity is photographed.

FIGS. 15A through 15E show various aberrations occurred in the lens arrangement shown in FIG. 13, when an object at a closer distance is photographed.

In the positive first lens group 10, the third lens element 13 is a negative meniscus lens element having the convex surface facing toward the object. Except the arrangement of the positive first lens group 10, the other lens arrangements are the same as that of the first embodiment.

The diaphragm S is provided 4.000 in front of (on the object side of) the negative third lens group 30 (surface No. 10).

TABLE 5

$F_{NO.} = 1:4.1$
f = 291.01
W = 4.2
fB = 80.85
m = 0.00--0.02--0.25

| Surf. No. | r | d | Nd | ν |
|---|---|---|---|---|
| 1 | 171.912 | 8.09 | 1.48749 | 70.2 |
| 2 | −1504.536 | 0.50 | — | — |
| 3 | 73.414 | 12.00 | 1.43875 | 95.0 |
| 4 | 1674.109 | 2.73 | — | — |
| 5 | 5346.467 | 3.50 | 1.80440 | 39.6 |
| 6 | 240.885 | 39.64 | — | — |
| 7 | 59.222 | 2.50 | 1.74999 | 43.8 |
| 8 | 32.298 | 9.31 | 1.49700 | 81.6 |
| 9 | 434.058 | 8.00-9.06-22.49 | — | — |
| 10 | −905.460 | 5.71 | 1.80518 | 25.4 |
| 11 | −104.036 | 2.20 | 1.57517 | 54.6 |
| 12 | 40.921 | 56.67-55.61-42.18 | — | — |
| 13 | −52.885 | 3.50 | 1.76867 | 26.7 |
| 14 | −47.477 | — | — | — |

Embodiment 6

Figure 16:
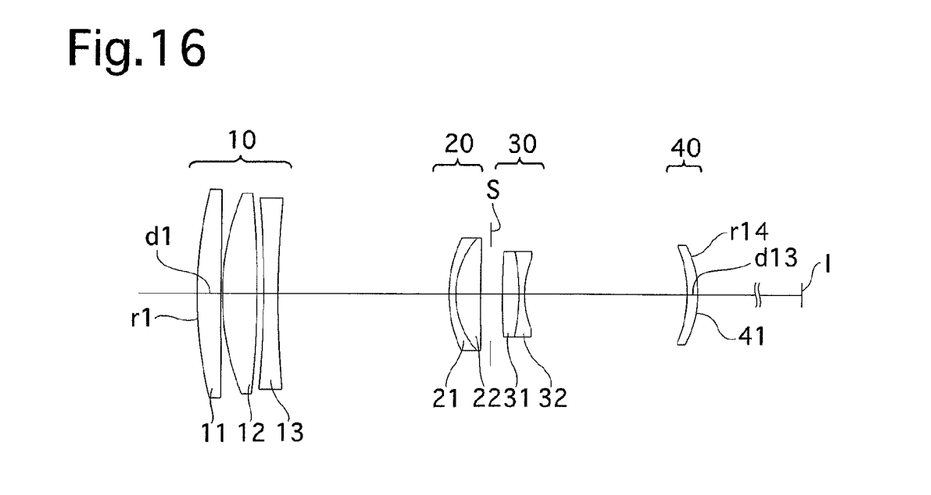
FIG. 16 shows a lens arrangement of a sixth embodiment of the telephoto lens system according to the present invention, when an object at infinity is in an in-focus state.
Figure 17A:
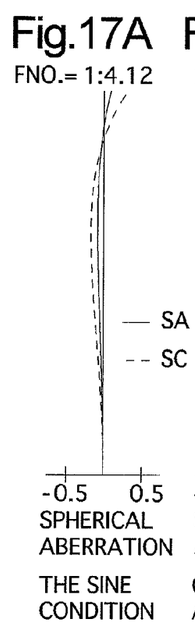
FIGS. 17A, 17B, 17C, 17D and 17E show aberrations occurred in the lens arrangement shown in FIG. 16, when an object at infinity is photographed.
Figure 17B:
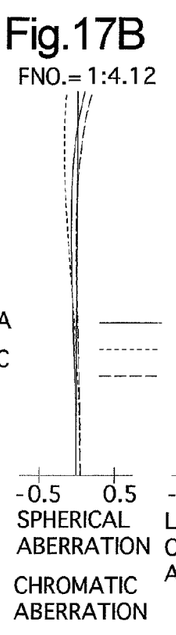
Figure 17C:
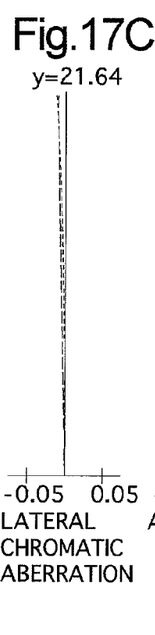
Figures 17D, 17E:
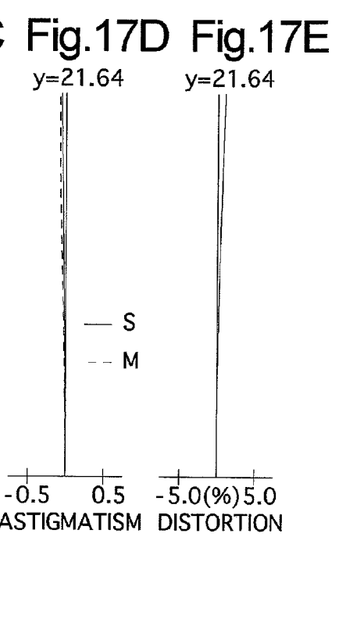
Figure 18A:
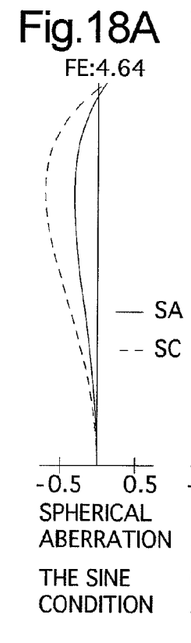
FIGS. 18A, 18B, 18C, 18D and 18E show aberrations occurred in the lens arrangement shown in FIG. 16, when the object at a closer distance is photographed.
Figures 18B, 18C:
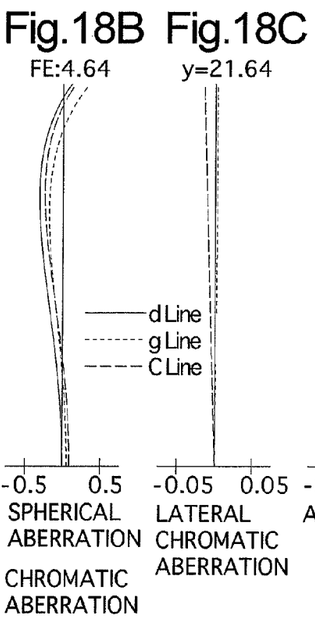
Figures 18D, 18E:
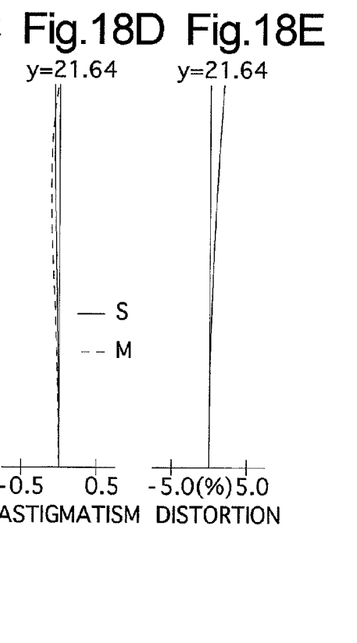

FIG. 16 shows the lens arrangement of the sixth embodiment of the telephoto lens system according to the present invention, when an object at infinity is in an in-focus state.

FIGS. 17A through 17E show aberrations occurred in the lens arrangement shown in FIG. 16, when an object at infinity is photographed.

FIGS. 18A through 18E show aberrations occurred in the lens arrangement shown in FIG. 16, when the object at a closer distance is photographed.

Table 6 shows the numerical data of the sixth embodiment.

In the negative third lens group 30, the sixth lens element 31 is a positive biconvex lens element. Except the arrangement of the negative third lens group 30, the other lens arrangements are the same as that of the second embodiment.

The diaphragm S is provided 4.000 in front of (on the object side of) the negative third lens group 30 (surface No. 10).

TABLE 6

$F_{NO.} = 1:4.1$
f = 292.20
W = 4.2
fB = 54.91
m = 0.00--0.02--0.26

| Surf. No. | r | d | Nd | ν |
|---|---|---|---|---|
| 1 | 144.256 | 8.28 | 1.48749 | 70.2 |
| 2 | 7306.498 | 0.50 | — | — |
| 3 | 89.289 | 12.15 | 1.43875 | 95.0 |
| 4 | −340.630 | 2.29 | — | — |
| 5 | −369.528 | 5.00 | 1.79952 | 42.2 |
| 6 | 345.506 | 59.22 | — | — |
| 7 | 44.144 | 2.30 | 1.79952 | 42.2 |
| 8 | 28.600 | 8.72 | 1.49700 | 81.6 |
| 9 | 769.111 | 7.50-8.36-18.75 | — | — |
| 10 | 208.986 | 5.92 | 1.80518 | 25.4 |
| 11 | −71.396 | 2.00 | 1.74400 | 44.8 |
| 12 | 31.785 | 56.45-55.59-45.20 | — | — |
| 13 | −42.448 | 3.50 | 1.68893 | 31.1 |
| 14 | −37.013 | — | — | — |

Embodiment 7

Figure 19:
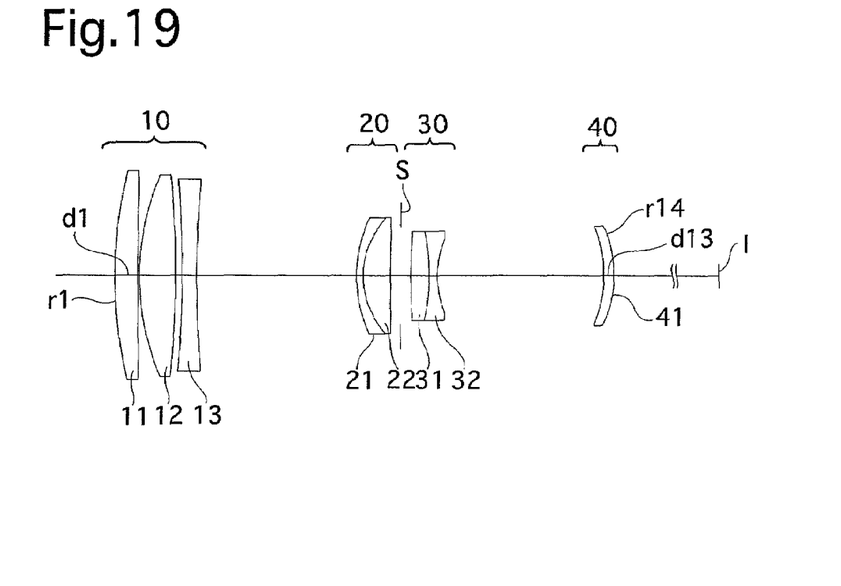
FIG. 19 shows a lens arrangement of a seventh embodiment of the telephoto lens system according to the present invention, when an object at infinity is in an in-focus state.
Figures 20A, 20B, 20C, 20D:
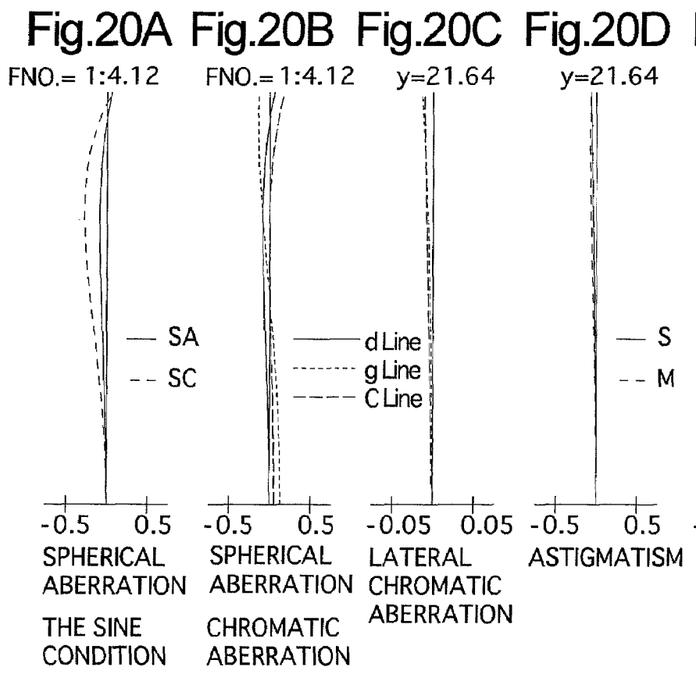
FIGS. 20A, 20B, 20C, 20D and 20E show aberrations occurred in the lens arrangement shown in FIG. 19, when an object at infinity is photographed; and in a position for photographing an object at infinity.
Figure 20E:
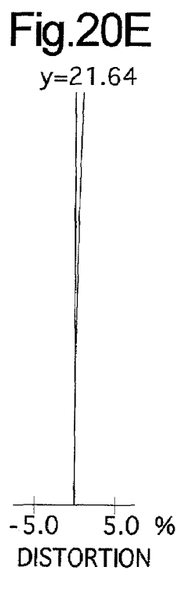
Figure 21A:
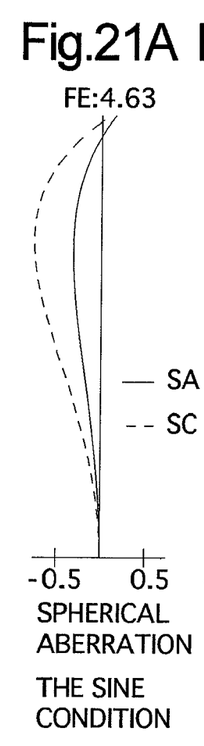
FIGS. 21A, 21B, 21C, 21D and 21E show aberrations occurred in the lens arrangement shown in FIG. 19, when the object at a closer distance is photographed.
Figures 21B, 21C:
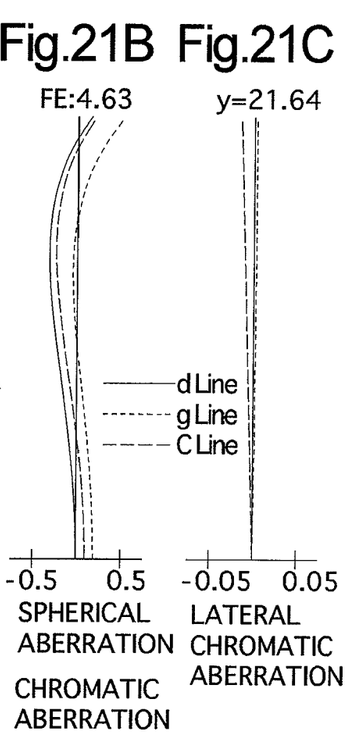
Figure 21D:
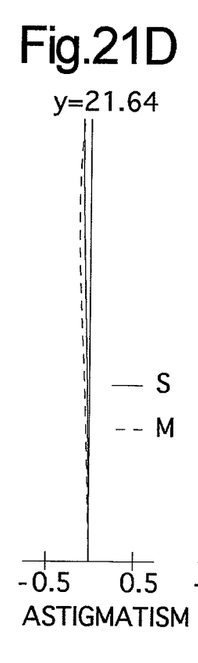
Figure 21E:
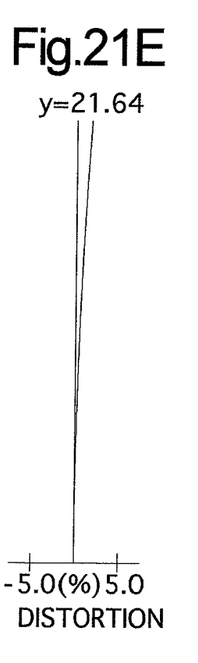

FIG. 19 shows the lens arrangement of the seventh embodiment of the telephoto lens system according to the present invention, when an object at infinity is in an in-focus state.

FIGS. 20A through 20E show aberrations occurred in the lens arrangement shown in FIG. 19, when an object at infinity is photographed.

FIGS. 21A through 21E show aberrations occurred in the lens arrangement shown in FIG. 19, when the object at a closer distance is photographed.

Table 7 shows the numerical data of the seventh embodiment.

The basic lens arrangement of the seventh embodiment is the same as that of the sixth embodiment.

The diaphragm S is provided 3.500 in front of (on the object side of) the negative third lens group 30 (surface No. 10).

TABLE 7

$F_{NO.} = 1:4.1$
f = 291.00
W = 4.2
fB = 56.93
m = 0.00--0.02--0.25

| Surf. No. | r | d | Nd | ν |
|---|---|---|---|---|
| 1 | 145.383 | 8.00 | 1.48749 | 70.2 |
| 2 | 2212.492 | 0.50 | — | — |
| 3 | 84.980 | 12.52 | 1.43875 | 95.0 |
| 4 | −334.381 | 2.23 | — | — |
| 5 | −375.882 | 5.00 | 1.80000 | 44.1 |
| 6 | 342.663 | 54.85 | — | — |

TABLE 7-continued $F_{NO.} = 1:4.1$
f = 291.00
W = 4.2
fB = 56.93
m = 0.00--0.02--0.25

| Surf. No. | r | d | Nd | ν |
|---|---|---|---|---|
| 7 | 44.773 | 2.30 | 1.79952 | 41.3 |
| 8 | 28.743 | 9.32 | 1.49700 | 81.6 |
| 9 | 577.155 | 7.00-7.86-18.29 | — | — |
| 10 | 240.820 | 6.30 | 1.80518 | 25.4 |
| 11 | −70.504 | 2.80 | 1.74260 | 44.4 |
| 12 | 32.934 | 56.96-56.10-45.67 | — | — |
| 13 | −44.149 | 3.50 | 1.69883 | 29.6 |
| 14 | −38.307 | — | — | — |

The numerical values of each condition for each embodiment are shown in Table 8.

TABLE 8

| | Cond(1) | Cond(2) | Cond(3) | Cond(4) | Cond(5) | Cond(6) |
|---|---|---|---|---|---|---|
| Embod. 1 | 1.70 | 2.53 | −4.28 | −0.31 | 95.0 | 81.2 |
| Embod. 2 | 1.79 | 2.59 | −3.70 | −0.09 | 95.0 | 81.2 |
| Embod. 3 | 1.46 | 2.49 | −4.40 | −0.32 | 95.0 | 81.2 |
| Embod. 4 | 1.67 | 2.53 | −4.24 | −0.28 | 95.0 | 81.2 |
| Embod. 5 | 1.76 | 2.50 | −3.71 | −0.11 | 95.0 | 81.2 |
| Embod. 6 | 1.57 | 2.75 | −5.34 | −0.13 | 95.0 | 81.2 |
| Embod. 7 | 1.59 | 2.74 | −5.21 | −0.13 | 95.0 | 81.2 |

As can be understood from Table 8, the first through seventh embodiments satisfy conditions (1) through (6). Furthermore, as can be understood from the aberration diagrams, the various aberrations are suitably corrected at an infinite photographic distance and at a close photographic distance.

According to a telephoto lens system of the present invention including a positive first lens group, a positive second lens group, a negative first lens group and a positive fourth lens group in this order from the object, the following features can be attained:

(i) fluctuations of distortion and those of spherical aberration occurred upon focusing are reduced, while an internal-focusing system is employed;

(ii) the minimum photographic distance can be made shorter; and (iii) manufacturing costs can be lowered.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A telephoto lens system comprises a positive first lens group, a positive second lens group, a diaphragm, a negative third lens group comprising a focusing lens group, and a positive fourth lens group, in this order from an object, wherein said positive first lens group comprises a positive first lens element, a positive second lens element, and a negative third lens element, in this order from the object;

wherein said positive second lens group comprises a negative or positive fourth lens element and a positive or negative fifth lens element which are cemented to each other, in this order from the object;

wherein said negative third lens group comprises a positive or negative sixth lens element and a negative or positive seventh lens element which are cemented to each other, in this order from the object;

wherein said positive fourth lens group comprises one positive eighth lens element;

wherein upon focusing on an object at infinity to an object at a closer distance, said negative third lens group is moved toward an image; and wherein said telephoto lens system satisfies the following conditions:

$$1.4 < f/f1 < 1.8$$

$$2.4 < f/f12 < 3.0$$

$$-5.5 < f/f3 < -3.5$$

wherein f designates the focal length of said telephoto lens system;

f1 designates the focal length of said positive first lens group;

f12 designates the combined focal length of said positive first lens group and said positive second lens groups; and f3 designates a focal length of said negative third lens group.

2. The telephoto lens system according to claim 1, further satisfying the following condition:

$$-0.4 < r13/f4 < -0.05$$

wherein r13 designates the radius of curvature of the object-side surface of said eighth lens element with r13 being <0; and f4 designates the focal length of said eighth lens element.

3. The telephoto lens system according to claim 1, further satisfying the following conditions:

$$vd_2 > 80$$

$$vd_5 > 80$$

wherein $vd_2$ designates the Abbe number of said second lens element; and $vd_5$ designates the Abbe number of said fifth lens element.

* * * * *